(12) United States Patent
Boday et al.

(10) Patent No.: US 10,566,029 B2
(45) Date of Patent: *Feb. 18, 2020

(54) REDUCED FRICTION RETENTION OF A DATA STORAGE CARTRIDGE WITHIN A STORAGE CELL

(71) Applicant: International Business Machines Corporation, Armonk, NY (US)

(72) Inventors: Dylan J. Boday, Tucson, AZ (US);
Andrew S. Green, Tucson, AZ (US);
Shawn M. Nave, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/801,146

(22) Filed: Nov. 1, 2017

(65) Prior Publication Data

US 2018/0054910 A1 Feb. 22, 2018

Related U.S. Application Data

(63) Continuation of application No. 15/148,931, filed on May 6, 2016, which is a continuation of application No. 13/606,666, filed on Sep. 7, 2012, now Pat. No. 9,355,652.

(51) Int. Cl.
*G11B 33/04* (2006.01)
*G11B 33/12* (2006.01)
*G11B 5/78* (2006.01)

(52) U.S. Cl.
CPC .............. *G11B 33/04* (2013.01); *G11B 5/78* (2013.01); *G11B 33/124* (2013.01); *G11B 33/128* (2013.01)

(58) Field of Classification Search
None
See application file for complete search history.

(56) References Cited

U.S. PATENT DOCUMENTS

| | | | |
|---|---|---|---|
| 1,534,259 A | 4/1925 | Dempsey et al. |
| 1,570,177 A | 1/1926 | Pointer et al. |
| 1,931,498 A | 10/1933 | Kattrein et al. |
| 2,469,586 A | 5/1949 | Wallace et al. |

(Continued)

FOREIGN PATENT DOCUMENTS

| | | | |
|---|---|---|---|
| JP | 03278359 A | * | 12/1991 |
| JP | 04186576 A | * | 7/1992 |

(Continued)

OTHER PUBLICATIONS

Corrected Notice of Allowance from U.S. Appl. No. 15/148,971, dated Dec. 14, 2017.

(Continued)

*Primary Examiner* — William J Klimowicz
(74) *Attorney, Agent, or Firm* — Zilka-Kotab, P.C.

(57) ABSTRACT

A method according to one embodiment includes inserting a data storage cartridge into an opening in a housing, the housing having a retention tab in the housing for engaging with a notch of the data storage cartridge for retaining the data storage cartridge in the housing. The retention tab has a texture. The texture of the retention tab is configured to reduce a force necessary for removing the data storage cartridge from the housing.

20 Claims, 7 Drawing Sheets

(56) References Cited

U.S. PATENT DOCUMENTS

| | | |
|---|---|---|
| 2,816,351 A | 12/1957 | Sauers et al. |
| 3,141,270 A | 7/1964 | Marcel et al. |
| RE26,039 E | 6/1966 | Johnson |
| 4,263,692 A | 4/1981 | Gremillion |
| 4,326,653 A * | 4/1982 | Stone .................. B60R 7/088 206/387.14 |
| 4,333,214 A | 6/1982 | Neumann et al. |
| 4,845,901 A | 7/1989 | Hamlin |
| 4,951,425 A | 8/1990 | Naghi |
| 4,993,100 A | 2/1991 | Halboth et al. |
| 5,025,526 A | 6/1991 | Ichitsubo et al. |
| 5,038,235 A * | 8/1991 | Ohzawa ............. G11B 23/0236 206/387.15 |
| 5,058,327 A | 10/1991 | Buchanan |
| 5,123,721 A * | 6/1992 | Seo ..................... G06F 1/184 312/333 |
| 5,177,906 A | 1/1993 | Balding et al. |
| 5,241,793 A | 9/1993 | Armato |
| 5,337,213 A | 8/1994 | Agur |
| 5,483,419 A | 1/1996 | Kaczeus, Sr. et al. |
| 5,532,888 A | 7/1996 | Acosta et al. |
| 5,652,742 A | 7/1997 | Baca et al. |
| 5,659,434 A | 8/1997 | Yamakawa et al. |
| 5,828,547 A | 10/1998 | Francovich et al. |
| 5,926,341 A | 7/1999 | Mueller et al. |
| 6,017,267 A | 1/2000 | Ariza et al. |
| 6,104,564 A | 8/2000 | Shibuya et al. |
| 6,129,427 A | 10/2000 | Todor |
| 6,166,908 A | 12/2000 | Samaras et al. |
| 6,187,106 B1 | 2/2001 | Backlund et al. |
| 6,204,992 B1 | 3/2001 | Rockwell |
| 6,252,765 B1 | 6/2001 | Balzaretti et al. |
| 6,259,578 B1 | 7/2001 | Christiansen et al. |
| 6,324,062 B1 | 11/2001 | Treiber et al. |
| 6,381,130 B1 | 4/2002 | Yen |
| 6,381,148 B1 | 4/2002 | Daskalakis et al. |
| 6,385,040 B2 | 5/2002 | Nabetani et al. |
| 6,456,501 B1 | 9/2002 | Rubenstein et al. |
| 6,473,706 B1 | 10/2002 | Gallo et al. |
| 6,483,107 B1 | 11/2002 | Rabinovitz et al. |
| 6,631,863 B2 | 10/2003 | Nawa |
| 6,661,747 B2 | 12/2003 | Mueller et al. |
| 6,683,785 B1 | 1/2004 | Chen |
| 6,776,345 B1 | 8/2004 | Liang |
| 6,819,525 B2 | 11/2004 | Brace et al. |
| 6,912,132 B2 | 6/2005 | Riddiford et al. |
| 7,102,885 B2 | 9/2006 | Chen et al. |
| 7,165,687 B1 | 1/2007 | Stevens et al. |
| 7,322,841 B1 | 1/2008 | Chuang |
| 7,386,868 B2 | 6/2008 | McCormack |
| 7,417,866 B1 | 8/2008 | Beseth et al. |
| 7,486,473 B2 | 2/2009 | Thorson et al. |
| 7,580,220 B1 | 8/2009 | Grow et al. |
| 7,719,855 B2 | 5/2010 | Berke et al. |
| 7,796,377 B2 | 9/2010 | Carney et al. |
| 7,843,663 B2 | 11/2010 | Nave et al. |
| 7,885,037 B2 | 2/2011 | Konshak et al. |
| 7,913,533 B2 | 3/2011 | Lee et al. |
| 8,023,259 B2 | 9/2011 | Lam et al. |
| 8,054,636 B2 | 11/2011 | Fan et al. |
| 8,081,488 B2 | 12/2011 | Kondo et al. |
| 8,264,833 B2 | 9/2012 | Fang et al. |
| 8,379,343 B2 | 2/2013 | Cheng et al. |
| 8,462,495 B1 | 6/2013 | Keefe et al. |
| 8,508,930 B2 | 8/2013 | Peng et al. |
| 8,608,072 B2 | 12/2013 | Jeong et al. |
| 8,636,432 B2 | 1/2014 | Kosuge |
| 8,677,381 B2 | 3/2014 | Kawakami |
| 8,699,178 B2 | 4/2014 | Kerns et al. |
| 8,946,568 B2 | 2/2015 | Tan |
| 9,039,486 B2 * | 5/2015 | Boday ................... B24D 99/00 451/28 |
| 9,305,599 B2 * | 4/2016 | Smyth .................. G11B 21/22 |
| 9,355,652 B2 * | 5/2016 | Boday .................. G11B 33/124 |
| 9,390,730 B2 * | 7/2016 | Boday .................. G11B 33/124 |
| 9,721,618 B2 * | 8/2017 | Pannu .................. G11B 33/022 |
| 9,918,402 B2 * | 3/2018 | Boday .................. G11B 33/124 |
| 2002/0006030 A1 | 1/2002 | Evanson et al. |
| 2002/0056778 A1 | 5/2002 | Nawa |
| 2002/0109967 A1 | 8/2002 | Nabetani et al. |
| 2002/0118529 A1 | 8/2002 | Babin et al. |
| 2003/0011976 A1 | 1/2003 | Treiber et al. |
| 2003/0090182 A1 | 5/2003 | Johnson |
| 2003/0112595 A1 | 6/2003 | Kwong et al. |
| 2003/0128527 A1 | 7/2003 | Chewning |
| 2004/0074082 A1 | 4/2004 | Kim et al. |
| 2005/0105265 A1 | 5/2005 | Petrov et al. |
| 2005/0117288 A1 | 6/2005 | Spychalla |
| 2005/0221742 A1 | 10/2005 | Su |
| 2005/0273797 A1 | 12/2005 | Shih |
| 2006/0092551 A1 | 5/2006 | Iwata |
| 2007/0162915 A1 | 7/2007 | Hong et al. |
| 2007/0206320 A1 | 9/2007 | Christie |
| 2007/0211366 A1 | 9/2007 | Chamorro et al. |
| 2007/0211422 A1 | 9/2007 | Liu et al. |
| 2007/0230107 A1 | 10/2007 | Hsu et al. |
| 2008/0025001 A1 | 1/2008 | Igarashi et al. |
| 2008/0036338 A1 | 2/2008 | Liang |
| 2008/0089022 A1 | 4/2008 | Cheung et al. |
| 2008/0101008 A1 | 5/2008 | Ulrich et al. |
| 2008/0123274 A1 | 5/2008 | Desrosiers et al. |
| 2008/0192381 A1 | 8/2008 | Minemura |
| 2008/0231988 A1 | 9/2008 | Nave et al. |
| 2008/0303393 A1 | 12/2008 | Krinsly |
| 2010/0039773 A1 | 2/2010 | Tilton et al. |
| 2010/0053880 A1 | 3/2010 | Jesionowski et al. |
| 2010/0187957 A1 | 7/2010 | Liang |
| 2010/0218203 A1 | 8/2010 | Kusumi |
| 2010/0246109 A1 | 9/2010 | Matsubara |
| 2011/0090639 A1 | 4/2011 | Li |
| 2011/0119691 A1 | 5/2011 | Goto et al. |
| 2011/0132851 A1 | 6/2011 | Christie, Jr. |
| 2011/0170255 A1 | 7/2011 | Kouyama et al. |
| 2011/0188195 A1 | 8/2011 | Scherf-Smith et al. |
| 2011/0222183 A1 | 9/2011 | Fry et al. |
| 2012/0020003 A1 | 1/2012 | Christie, Jr. |
| 2012/0327595 A1 | 12/2012 | Caldwell et al. |
| 2013/0080713 A1 | 3/2013 | Steinhilber |
| 2013/0107424 A1 | 5/2013 | Thomas et al. |
| 2013/0189056 A1 | 7/2013 | Sudou |
| 2014/0068641 A1 * | 3/2014 | Kuroda ............... G11B 23/0308 720/657 |
| 2014/0069250 A1 * | 3/2014 | Boday ................... B24D 99/00 83/861 |
| 2014/0071609 A1 * | 3/2014 | Boday .................. G11B 33/124 361/679.31 |
| 2016/0012830 A1 | 1/2016 | Boday et al. |
| 2016/0255742 A1 * | 9/2016 | Boday .................. G11B 33/124 361/679.39 |
| 2016/0255743 A1 | 9/2016 | Boday et al. |

FOREIGN PATENT DOCUMENTS

| | | | | |
|---|---|---|---|---|
| JP | 05166278 A * | 7/1993 | | |
| JP | 2000021112 A * | 1/2000 | ........... | G11B 17/043 |
| JP | 2000132960 A * | 5/2000 | | |
| JP | 2002093117 A * | 3/2002 | | |
| JP | 2003223756 A * | 8/2003 | ........... | G11B 17/043 |
| WO | WO-0000979 A1 * | 1/2000 | ........... | G11B 17/043 |

OTHER PUBLICATIONS

Boday et. al., U.S. Appl. No. 13/606,666, filed Sep. 7, 2012.

Non-Final Office Action from U.S. Appl. No. 13/606,666, dated Jul. 17, 2014.

Non-Final Office Action from U.S. Appl. No. 13/606,666, dated Dec. 10, 2014.

Election/Restriction Requirement from U.S. Appl. No. 13/606,666, dated Apr. 8, 2014.

Final Office Action from U.S. Appl. No. 13/606,666, dated Mar. 27, 2015.

(56) References Cited

OTHER PUBLICATIONS

Non-Final Office Action from U.S. Appl. No. 13/606,666, dated Jul. 2, 2015.
Non-Final Office Action from U.S. Appl. No. 13/606,812, dated Jun. 30, 2014.
Notice of Allowance from U.S. Appl. No. 13/606,812, dated Oct. 27, 2014.
Notice of Allowance from U.S. Appl. No. 13/606,812, dated Jan. 21, 2015.
Boday et. al., U.S. Appl. No. 13/606,812, filed Sep. 7, 2012.
Boday et al., U.S. Appl. No. 14/862,659, filed Sep. 23, 2015.
Notice of Allowance from U.S. Appl. No. 13/606,666, dated Nov. 6, 2015.
Non-Final Office Action from U.S. Appl. No. 14/862,659, dated Dec. 3, 2015.
Notice of Allowance from U.S. Appl. No. 13/606,666, dated Mar. 11, 2016.
Notice of Allowance from U.S. Appl. No. 14/862,659, dated Apr. 6, 2016.
Boday et. al., U.S. Appl. No. 15/148,931, filed May 6, 2016.
Boday et. al., U.S. Appl. No. 15/148,971, filed May 6, 2016.
Corrected Notice of Allowance from U.S. Appl. No. 14/862,659, dated Jun. 14, 2016.
Non-Final Office Action from U.S. Appl. No. 15/148,931, dated Oct. 7, 2016.
Non-Final Office Action from U.S. Appl. No. 15/148,971, dated Oct. 7, 2016.
Final Office Action from U.S. Appl. No. 15/148,971, dated Jan. 30, 2017.
Final Office Action from U.S. Appl. No. 15/148,931, dated Feb. 9, 2017.
Advisory Action from U.S. Appl. No. 15/148,931, dated May 19, 2017.
Advisory Action from U.S. Appl. No. 15/148,971, dated May 19, 2017.
Notice of Allowance from U.S. Appl. No. 15/148,971, dated Jul. 13, 2017.
Notice of Allowance from U.S. Appl. No. 15/148,931, dated Jul. 27, 2017.
Corrected Notice of Allowance from U.S. Appl. No. 15/148,931, dated Aug. 24, 2017.
Corrected Notice of Allowance from U.S. Appl. No. 15/148,971, dated Aug. 25, 2017.
Non-Final Office Action from U.S. Appl. No. 15/148,931, dated Nov. 29, 2017.
Corrected Notice of Allowance from U.S. Appl. No. 15/148,971, dated Nov. 30, 2017.
Final Office Action from U.S. Appl. No. 15/148,931, dated Apr. 20, 2018.
Notice of Allowance from U.S. Appl. No. 15/148,971, dated Nov. 3, 2017.
Non-Final Office Action from U.S. Appl. No. 15/148,931, dated Sep. 20, 2018.

* cited by examiner

REDUCED FRICTION RETENTION OF A DATA STORAGE CARTRIDGE WITHIN A STORAGE CELL

BACKGROUND

This disclosure relates to the retention of data storage cartridges within a storage cell.

Automated data storage libraries are known for providing cost effective storage and retrieval of large quantities of data. The data in automated data storage libraries is stored on data storage media that are, in turn, stored on storage cells or the like inside the library in a fashion that renders the media, and its resident data, accessible for physical retrieval. Such media is commonly termed "removable media." Data storage media may comprise any type of media on which data may be stored and which may serve as removable media, including but not limited to magnetic media (such as magnetic tape or disks), optical media (such as optical tape or disks), electronic media (such as PROM, EEPROM, flash PROM, MRAM, Compactflash®, Smartmedia®, Memory Stick®, etc.), or other suitable media. Typically, the data stored in automated data storage libraries is resident on data storage media that is contained within a cartridge and referred to as a data storage cartridge. An example of a data storage cartridge that is widely employed in automated data storage libraries for mass data storage is a magnetic tape cartridge.

SUMMARY

A method according to one embodiment includes inserting a data storage cartridge into an opening in a housing, the housing having a retention tab in the housing for engaging with a notch of the data storage cartridge for retaining the data storage cartridge in the housing. The retention tab has a texture. The texture of the retention tab is configured to reduce a force necessary for removing the data storage cartridge from the housing.

A method according to another embodiment includes removing a data storage cartridge through an opening in a housing, the data storage cartridge being in the housing prior to the removing. The housing has a retention tab in the housing that is engaged with a notch of the data storage cartridge for retaining the data storage cartridge in the housing when the data storage cartridge is in the housing. The retention tab has a texture. The texture of the retention tab reduces a force necessary for removing the data storage cartridge from the housing.

BRIEF DESCRIPTION OF THE DRAWINGS

Embodiments of the present invention are understood by referring to the figures in the attached drawings, as provided below.

DETAILED DESCRIPTION

Figure 1:
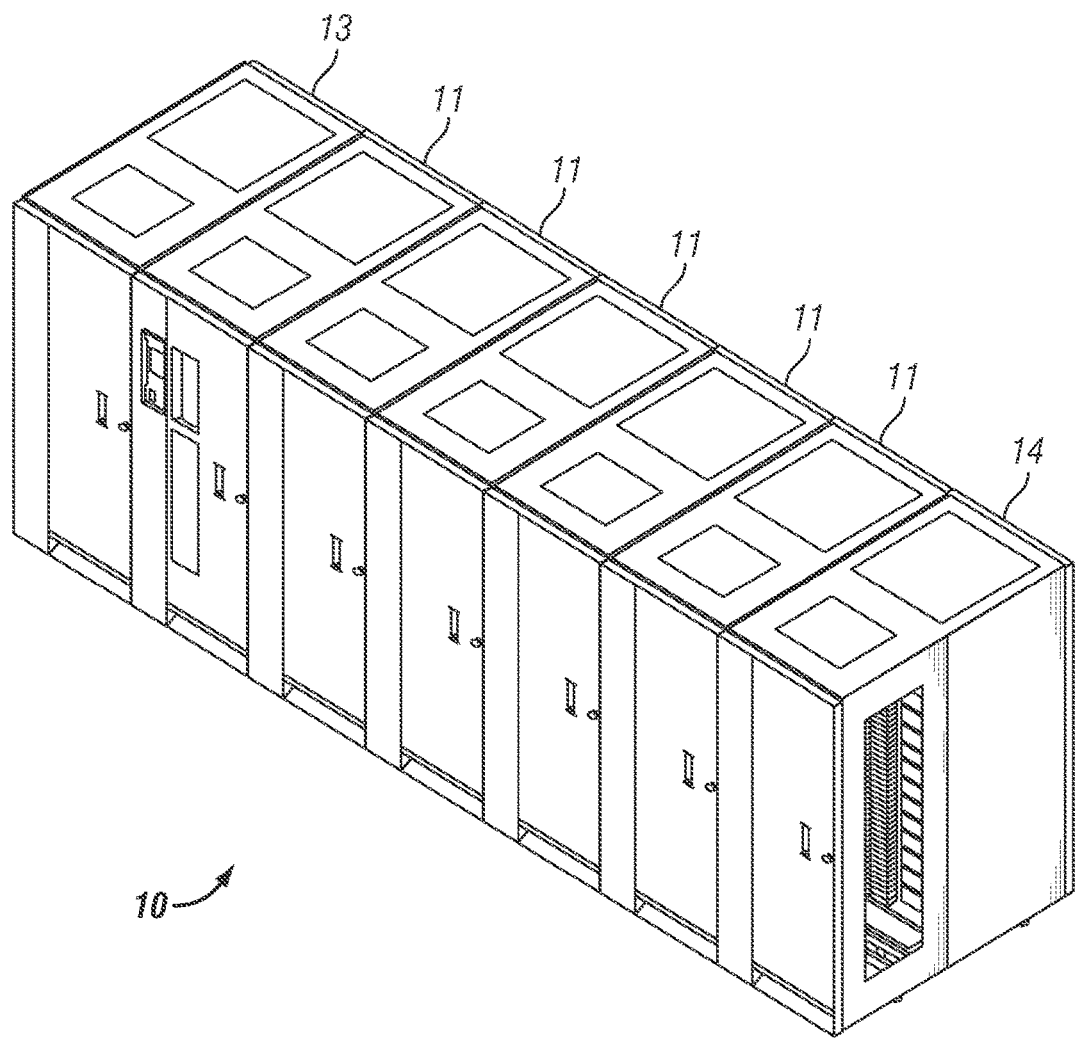
FIG. 1 illustrates automated data storage library with the view specifically depicting a library having a left hand service bay, multiple storage frames and a right hand service bay in accordance with an embodiment of the invention.

Automated data storage libraries include one or more accessors to move data storage cartridges between storage cells and to data storage drives. The storage cells must retain the data storage cartridges such that outside influences such as normal machine or door opening or closing operations etc. do not cause the data storage cartridges to move out of the storage cells. However, the retention force of the storage cell must still be easily overcome by an accessor removing or adding cartridges to the storage cell. Retention tabs in a storage cell may be used to engage with a notch in a data storage cartridge to retain the data storage cartridge in the slot. The notch of the data storage cartridge, and the data storage cartridge itself, have generally smooth surfaces. Similarly, the retention tab of the storage cell, and the storage cell itself, have generally smooth surfaces. The smooth surface of the notch of the data storage cartridge comes into contact with the smooth surface of the retention tab of the storage cell and the data storage cartridge is retained in the storage cell by a certain amount of friction. However, in some cases, the amount of friction between the retention tab and notch is too high such that the accessor is not able to remove the data storage cartridge from the storage cell. Further, the amount of friction between the retention tab and notch is not consistent for each data storage cartridge and its respective storage cell, such that accessor may be able to remove some data storage cartridges from their respective storage cells, but not be able to remove others. These issues may result in the accessor being unable to remove one or more data storage cartridges from their respective storage cells causing downtime for the automated data storage library.

Described are embodiments of an invention for a textured interface between a notch of a data storage cartridge and a retention tab of a storage cell to provide a consistent and low friction force that retains the data storage cartridge within the cell but allows the accessor to easily remove the data storage cartridge when needed. In one embodiment, the retention tab of a storage cell includes at least one textured surface. In another embodiment, the notch on a data storage cartridge includes at least one textured surface.

The storage cell includes a housing for storing a data storage cartridge and includes an opening for inserting and removing a data storage cartridge. A retention tab within the housing engages with the notch of the data storage cartridge to retain the data storage cartridge with the housing. In one embodiment, the retention tab of a storage cell includes at least one textured surface. In another embodiment, the notch on a data storage cartridge includes at least one textured surface. The textured surface reduces the contact surface between the retention tab and the notch of the data storage cartridge. Accordingly, the reduced contact surface between the retention tab and notch reduces the amount of friction between the retention tab and the notch. The data storage cartridge can thus be removed from the storage cell with less force than that required by the prior art having a generally smooth interface between the notch of the data storage cartridge and the retention tab of the storage cell Further, the textured surface allows for a more consistent amount of friction between the notch and retention tab for each data storage cartridge and its respective storage cell. This consistent amount of friction between the notch and retention tab allows for the amount force required to move one data storage cartridge from its respective storage cell to be close to the amount of force required to move another data storage cartridge from its respective storage cell. Thus, a consistent amount of force can be applied by the accessor to remove each data storage cartridge from their respective storage cells. Thus, the textured interface between notch of the data storage cartridge and the retention tab allows for a low and consistent force to remove a plurality of data storage cartridges from their respective storage cells.

It will be obvious, however, to one skilled in the art, that embodiments of the present invention may be practiced without some or all of these specific details. In other instances, well known process operations have not been described in detail to prevent obscuring the embodiments of the present invention described herein.

It is understood that all surfaces have a certain amount of texture. Therefore, for purposes of the description herein, a textured surface is a surface that has more texture than an immediate surrounding area. For example, in the embodiment in which the retention tab of a storage cell has a textured surface, the retention tab is said to have a textured surface when the textured surface has more texture than that of the immediate surrounding area (e.g. the sidewall of the storage cell if the retention tab is provided on a sidewall of the storage cell) Similarly, in the embodiment in which the notch of the data storage cartridge has a textured surface, the notch is said to have a textured surface when the textured surface of the notch has more texture than that of the immediate surrounding area (e.g. the sidewall of the data storage cartridge if the notch is provided on the sidewall of the data storage cartridge). Accordingly, a non-textured surface or a smooth surface is defined herein as a surface that has the same amount of texture or less texture than an immediate surrounding area.

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention. The invention will be described as embodied in an automated data storage library for use in a data processing environment. Although the invention shown used magnetic tape cartridges, one skilled in the art would recognize that the invention equally applies to optical disk cartridges or other removable storage media.

Figure 2:
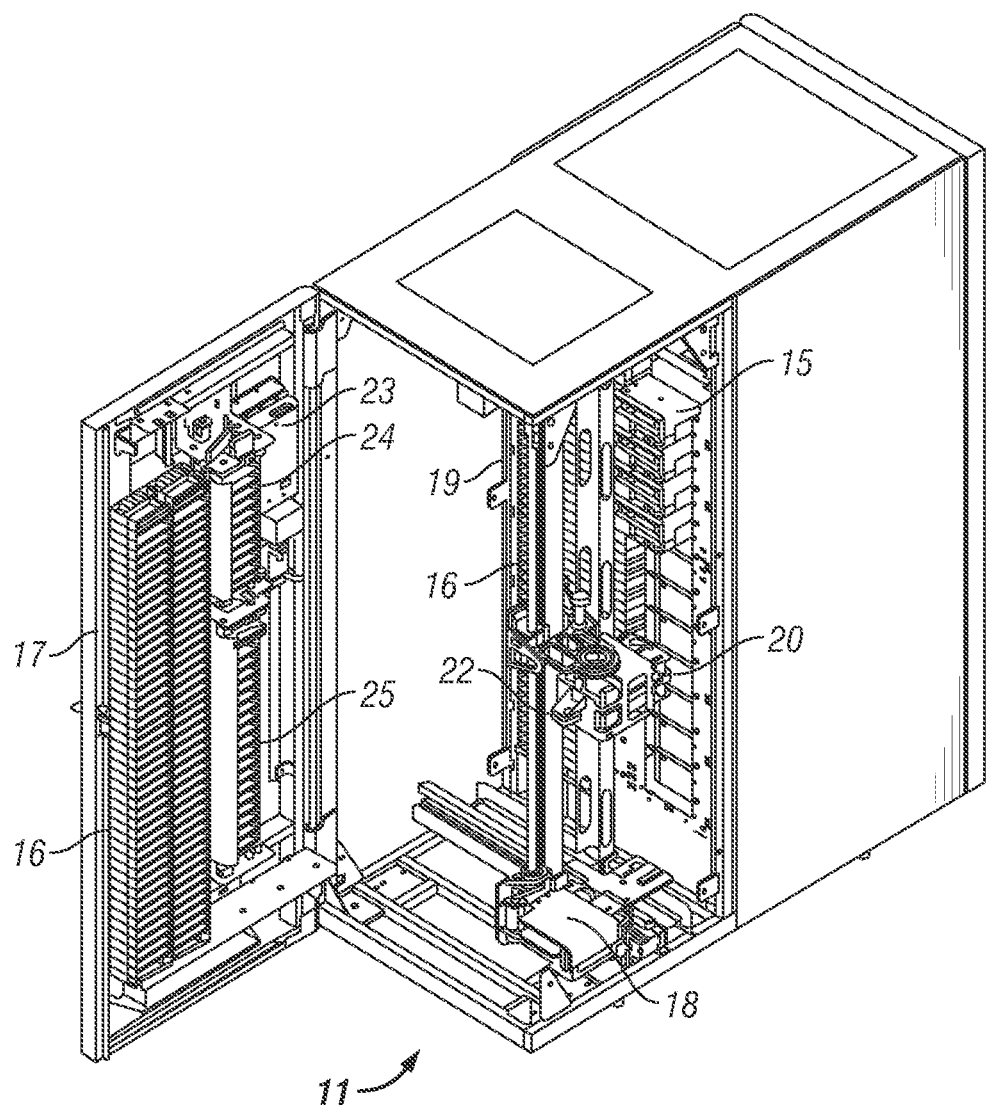
FIG. 2 illustrates an automated data storage library with the view specifically depicting an exemplary basic configuration of the internal components of a library in accordance with an embodiment of the invention.

Turning now to the Figures, FIGS. 1 and 2 illustrate an automated data storage library 10 which stores and retrieves data storage cartridges containing data storage media (not shown) in storage cells 16. It is noted that references to "data storage media" herein refer to data storage cartridges, and for purposes herein the two terms may be used synonymously. An example of an automated data storage library which may be used in the described embodiments is the IBM® 3584 UltraScalable Tape Library, and has a configuration as depicted in FIGS. 1 and 2. The library of FIG. 1 comprises a left hand service bay 13, one or more storage frames 11, and right hand service bay 14. As will be discussed, a frame may comprise an expansion component of the library. Frames may be added or removed to expand or reduce the size and/or functionality of the library. Frames may comprise additional storage cells, drives, import/export stations, accessors, operator panels, etc.

FIG. 2 shows an example of a storage frame 11, which is the base frame of the library 10 and is contemplated to be the minimum configuration of the library. In this minimum configuration, there is only a single accessor (i.e., there are no redundant accessors) and there is no service bay. The library 10 is arranged for accessing data storage media in response to commands from at least one external host system (not shown), and comprises a plurality of storage cells 16, on front wall 17 and rear wall 19 for storing data storage cartridges that contain data storage media; at least one data storage drive 15 for reading and/or writing data with respect to the data storage media; and a first accessor 18 for transporting the data storage media between the plurality of storage cells 16 and the data storage drive(s) 15. The data storage drives 15 may be optical disk drives or magnetic tape drives, or other types of data storage drives as are used to read and/or write data with respect to the data storage media. The storage frame 11 may optionally comprise an operator panel 23 or other user interface, such as a web-based interface, which allows a user to interact with the library. The storage frame 11 may optionally comprise an upper I/O station 24 and/or a lower I/O station 25, which allows data storage media to be inserted into the library and/or removed from the library without disrupting library operation. The library 10 may comprise one or more storage frames 11, each having storage cells 16 accessible by first accessor 18.

As described above, the storage frames 11 may be configured with different components depending upon the intended function. One configuration of storage frame 11 may comprise storage cells 16, data storage drive(s) 15, and other optional components to store and retrieve data from the data storage cartridges. The first accessor 18 comprises a gripper assembly 20 for gripping one or more data storage media and may include a bar code scanner 22 or other reading system, such as a cartridge memory reader or similar system, mounted on the gripper 20, to "read" identifying information about the data storage media.

Figure 3:
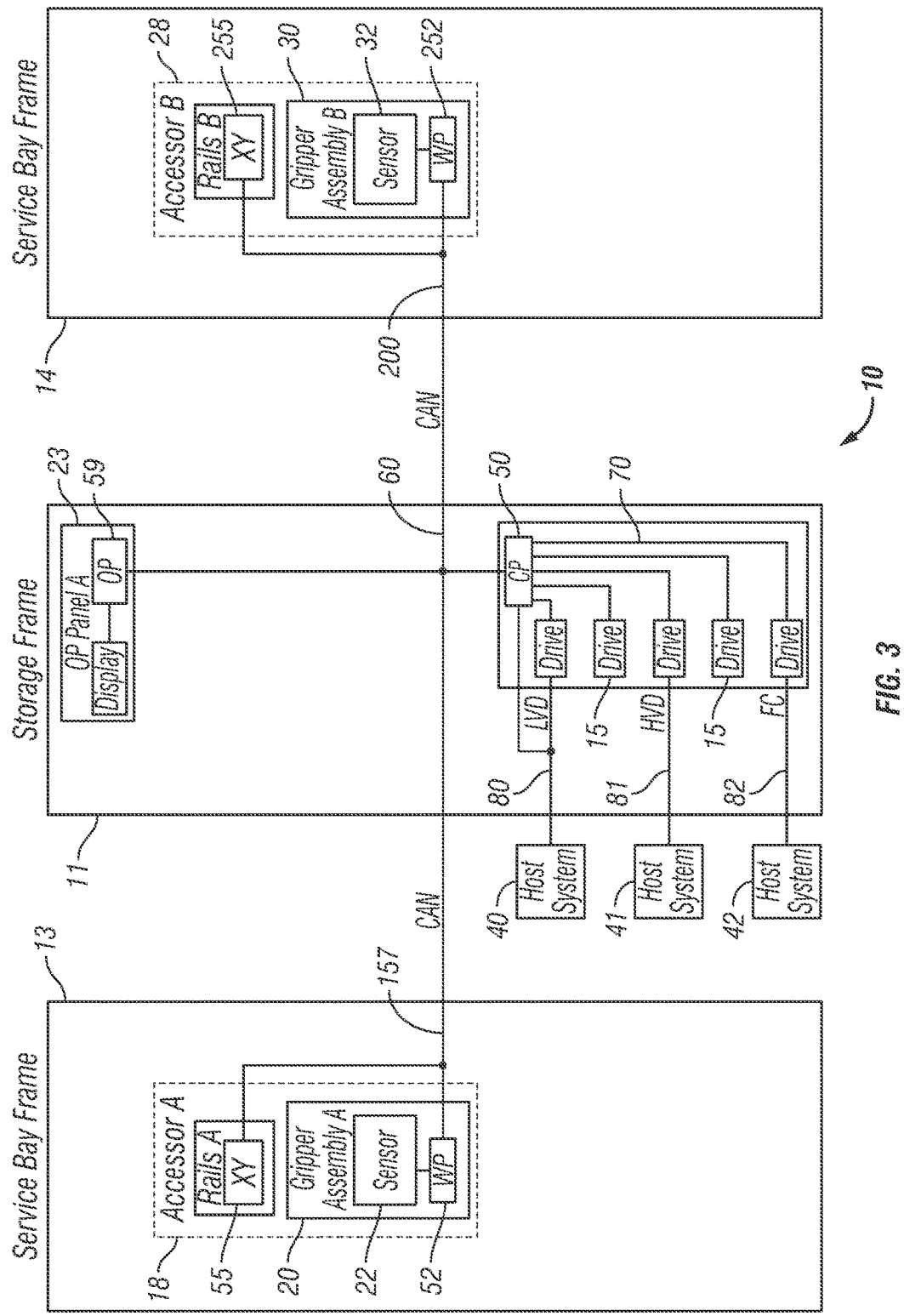
FIG. 3 is a block diagram of an automated data storage library with the diagram specifically depicting a library that employs a distributed system of modules with a plurality of processor nodes in accordance with an embodiment of the invention.

FIG. 3 illustrates an embodiment of an automated data storage library 10 of FIGS. 1 and 2, which employs a distributed system of modules with a plurality of processor nodes. An example of an automated data storage library which may implement the distributed system depicted in the block diagram of FIG. 3, and which may implement the described embodiments, is the IBM 3584 UltraScalable Tape Library.

While the automated data storage library 10 has been described as employing a distributed control system, the described embodiments may be implemented in automated data storage libraries regardless of control configuration, such as, but not limited to, an automated data storage library having one or more library controllers that are not distributed. The library of FIG. 3 comprises one or more storage frames 11, a left hand service bay 13 and a right hand service bay 14. The left hand service bay 13 is shown with a first accessor 18. As discussed above, the first accessor 18 comprises a gripper assembly 20 and may include a reading system 22 to "read" identifying information about the data storage media. The right hand service bay 14 is shown with a second accessor 28. The second accessor 28 comprises a gripper assembly 30 and may include a reading system 32 to "read" identifying information about the data storage media. In the event of a failure or other unavailability of the first accessor 18, or its gripper 20, etc., the second accessor 28 may perform some or all of the functions of the first accessor 18. The two accessors 18, 28 may share one or more mechanical paths or they may comprise completely independent mechanical paths. In one example, the accessors 18, 28 may have a common horizontal rail with independent vertical rails. The first accessor 18 and the second accessor 28 are described as first and second for descriptive purposes only and this description is not meant to limit either accessor to an association with either the left hand service bay 13, or the right hand service bay 14.

In the exemplary library, first accessor 18 and second accessor 28 move their grippers in at least two directions, called the horizontal "X" direction and vertical "Y" direction, to retrieve and grip, or to deliver and release the data storage media at the storage cells 16 and to load and unload the data storage media at the data storage drives 15.

The exemplary library 10 receives commands from one or more host systems 40, 41 or 42. The host systems, such as host servers, communicate with the library directly, e.g., on path 80, through one or more control ports (not shown), or through one or more data storage drives 15 on paths 81, 82, providing commands to access particular data storage media and move the media, for example, between the storage cells 16 and the data storage drives 15. The commands are typically logical commands identifying the media and/or logical locations for accessing the media. The terms "commands" and "work requests" are used interchangeably herein to refer to such communications from the host system 40, 41 or 42 to the library 10 as are intended to result in accessing particular data storage media within the library 10.

The exemplary library is controlled by a distributed control system receiving the logical commands from hosts, determining the required actions, and converting the actions to physical movements of first accessor 18 and/or second accessor 28.

In the exemplary library, the distributed control system comprises a plurality of processor nodes, each having one or more processors. In one example of a distributed control system, a communication processor node 50 may be located in a storage frame 11. The communication processor node provides a communication link for receiving the host commands, either directly or through the drives 15, via at least one external interface, e.g., coupled to line 80.

The communication processor node 50 may additionally provide a communication link 70 for communicating with the data storage drives 15. The communication processor node 50 may be located in the frame 11, close to the data storage drives 15. Additionally, in an example of a distributed processor system, one or more additional work processor nodes 52, 252 are provided, which may comprise, e.g., a work processor node 52 that may be located at first accessor 18, and that is coupled to the communication processor node 50 via a network 60, 157. Each work processor node may respond to received commands that are broadcast to the work processor nodes from any communication processor node, and the work processor nodes may also direct the operation of the accessors, providing move commands. One or more XY processor nodes 55, 255 are provided, which may comprise, e.g., an XY processor node 55 located at an XY system of first accessor 18. The XY processor node 55 is coupled to the network 60, 157, and is responsive to the move commands, operating the XY system to position the gripper 20.

Also, an operator panel processor node 59 may be provided at the optional operator panel 23 for providing an interface for communicating between the operator panel and the communication processor node 50, the work processor nodes 52, 252, and the XY processor nodes 55, 255.

A network, for example comprising a common bus 60, is provided, coupling the various processor nodes. The network may comprise a robust wiring network, such as the commercially available CAN (Controller Area Network) bus system, which is a multi-drop network, having a standard access protocol and wiring standards, for example, as defined by CiA, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

The communication processor node 50 is coupled to each of the data storage drives 15 of a storage frame 11, via lines 70, communicating with the drives and with host systems 40, 41 and 42. Alternatively, the host systems may be directly coupled to the communication processor node 50, at input 80 for example, or to control port devices (not shown) which connect the library to the host system(s) with a library interface similar to the library/drive interface. As is known to those of skill in the art, various communication arrangements may be employed for communication with the hosts and with the data storage drives 15. In the example of FIG. 3, host connections 80 and 81 are SCSI busses. Bus 82 comprises an example of a Fibre Channel bus which is a high speed serial data interface, allowing transmission over greater distances than the SCSI bus systems.

The data storage drives 15 may be in close proximity to the communication processor node 50, and may employ a short distance communication scheme, such as SCSI, RS-422, USB (Universal Serial Bus), SAS (Serial Attached SCSI), etc. The data storage drives 15 are thus individually coupled to the communication processor node 50 by means of lines 70. Alternatively, the data storage drives 15 may be coupled to the communication processor node 50 through one or more networks, such as CAN, Ethernet, etc.

Additional storage frames 11 may be provided and each is coupled to the adjacent storage frame. Any of the storage frames 11 may comprise communication processor nodes 50, storage cells 16, data storage drives 15, and networks 60.

Further, as described above, the automated data storage library 10 may comprise a plurality of accessors. A second accessor 28, for example, is shown in a right hand service bay 14 of FIG. 3. The second accessor 28 may comprise a gripper 30 for accessing the data storage media, and an XY system 255 for moving the second accessor 28. The second accessor 28 may run on the same horizontal mechanical path as first accessor 18, or on an adjacent path. The exemplary control system additionally comprises an extension network 200 forming a network coupled to network 60 of the storage frame(s) 11 and to the network 157 of left hand service bay 13.

In FIG. 3 and the accompanying description, the first and second accessors are associated with the left hand service bay 13 and the right hand service bay 14 respectively. This is for illustrative purposes and there may not be an actual association. In addition, network 157 may not be associated with the left hand service bay 13 and network 200 may not be associated with the right hand service bay 14. Depending on the design of the library, it may not be necessary to have a left hand service bay 13 and/or a right hand service bay 14.

Figure 4:
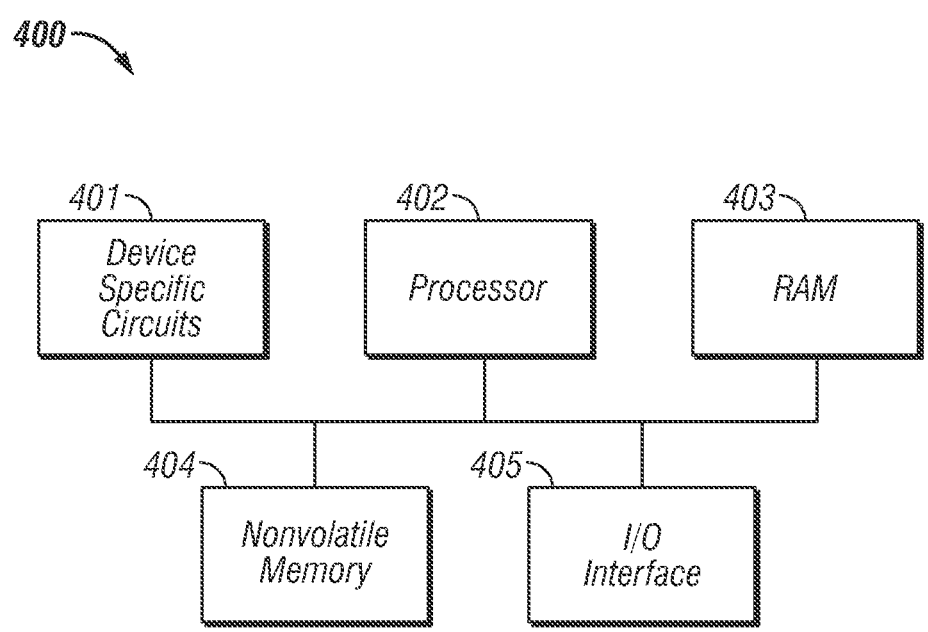
FIG. 4 is a block diagram depicting an exemplary controller configuration in accordance with an embodiment of the invention.

An automated data storage library 10 typically comprises one or more controllers to direct the operation of the automated data storage library. Host computers and data storage drives typically comprise similar controllers. A controller may take many different forms and may comprise, for example but not limited to, an embedded system, a distributed control system, a personal computer, or a workstation. Essentially, the term "controller" as used herein is intended in its broadest sense as a device that contains at least one processor, as such term is defined herein. FIG. 4 shows a typical controller 400 with a processor 402, RAM (Random Access Memory) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, FPGA (Field Programmable Gate Array), ASIC (Application Specific Integrated Circuit), discrete logic, or the like. The RAM (Random Access Memory) 403 is typically used to hold variable data, stack data, executable instructions, and the like. The nonvolatile memory 404 may comprise any type of nonvolatile memory such as, but not limited to, ROM (Read Only Memory), PROM (Programmable Read Only Memory), EEPROM (Electrically Erasable Programmable Read Only Memory), flash PROM (Programmable Read Only Memory), NVRAM (Non-Volatile Random Access Memory), MRAM (Magnetoresistive Random Access Memory), battery backup RAM, CompactFlash®, SD (Secure Digital), CD (Compact Disk), DVD (Digital Versatile Disk), hard disk drives, etc. The nonvolatile memory 404 is typically used to hold the executable firmware and any nonvolatile data. The I/O interface 405 comprises a communication interface that allows the processor 402 to communicate with devices external to the controller 400. Examples may comprise, but are not limited to, serial interfaces such as RS-232, USB (Universal Serial Bus), SCSI (Small Computer Systems Interface), Fibre Channel, Ethernet, SAS (Serial Attached SCSI), etc. The device specific circuits 401 provide additional hardware to enable the controller 400 to perform unique functions such as, but not limited to, motor control of a cartridge gripper. The device specific circuits 401 may comprise electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

While the automated data storage library 10 is described as employing a distributed control system, the described embodiments may be implemented in various automated data storage libraries regardless of control configuration, such as, but not limited to, an automated data storage library having one or more library controllers that are not distributed. A library controller may comprise one or more dedicated controllers of a prior art library. For example, there may be a primary controller and a backup controller. In addition, a library controller may comprise one or more processor nodes of a distributed control system. For example, communication processor node 50 (FIG. 3) may comprise the library controller while the other processor nodes (if present) may assist the library controller and/or may provide backup or redundant functionality. In another example, communication processor node 50 and work processor node 52 may work cooperatively to comprise the library controller while the other processor nodes (if present) may assist the library controller and/or may provide backup or redundant functionality. Still further, all of the processor nodes may comprise the library controller. Herein, library controller may comprise a single processor or controller or it may comprise multiple processors or controllers.

Figure 5:
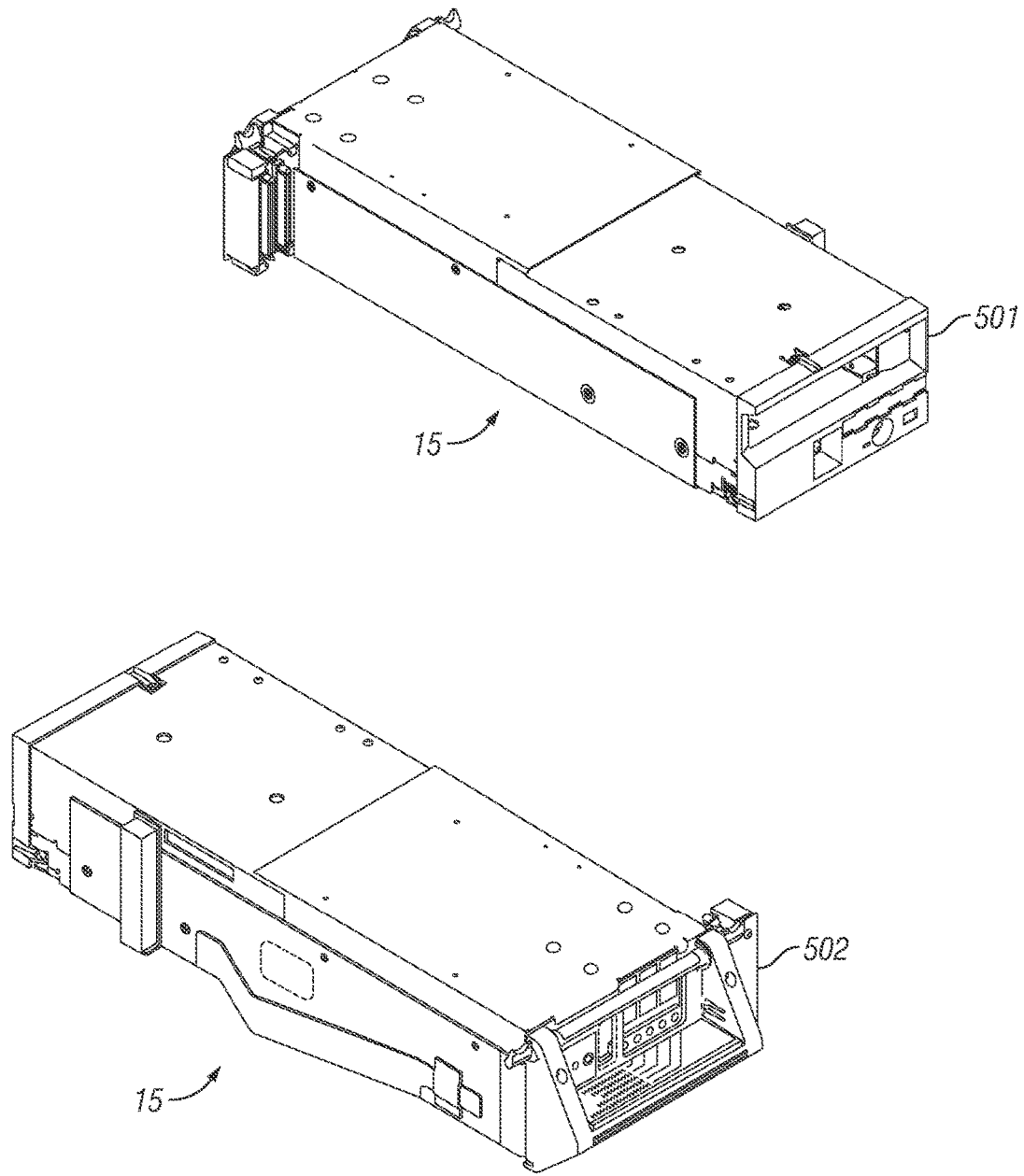
FIG. 5 illustrates a front and rear view of a data storage drive in accordance with an embodiment of the invention.

FIG. 5 illustrates an embodiment of the front 501 and rear 502 of a data storage drive 15. In the example of FIG. 5, the data storage drive 15 comprises a hot-swap drive canister. This is only an example and is not meant to limit the invention to hot-swap drive canisters. In fact, any configuration of data storage drive may be used whether or not it comprises a hot-swap drive canister.

Figure 6:
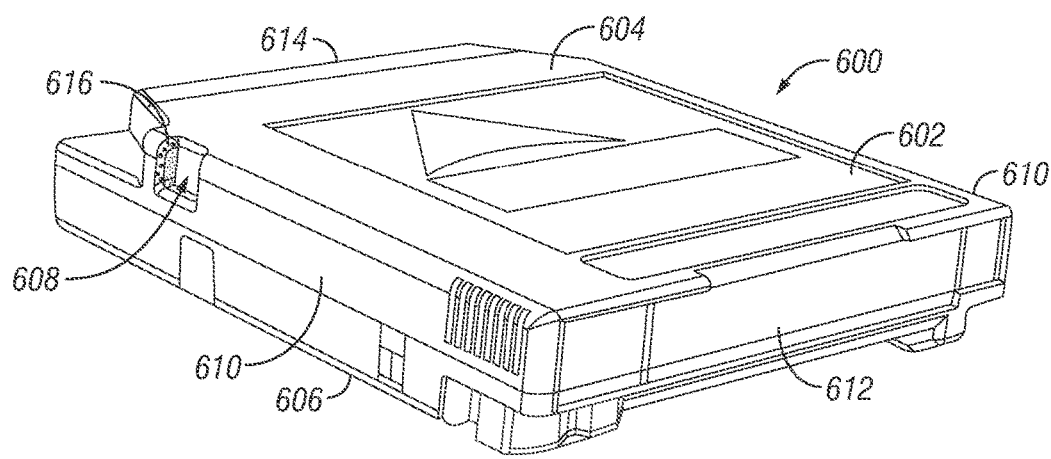
FIG. 6 illustrates a data storage cartridge in accordance with an embodiment of the invention.

FIG. 6 illustrates an embodiment of a data storage cartridge 600. Data storage cartridge 600 comprises data storage media (not shown). In one embodiment, the data storage media may be magnetic tape and, accordingly, data storage cartridge 600 may be a tape cartridge. The data storage cartridge 600 is inserted in data storage drive 15 so that the data may be read and/or written to the data storage media. As shown in FIG. 6, the data storage cartridge 600 comprises a generally rectangular housing 602 forming an exterior dimensional form factor of the data storage cartridge 600. The cartridge housing 602 has a top 604, a bottom 606, two sides 610, a front 612, and a back 614. A notch 608 is provided on the data storage cartridge 600 for engaging with a retention tab of a storage cell 16 of an automated data storage library 10. As shown, in one embodiment the notch 608 is on a one side 610 of the data storage cartridge 600. However, one of ordinary skill in the art would understand that the notch 608 could be provided at any location on the data storage cartridge 600. For example, the notch 608 could be provided either side 610 of the data storage cartridge, the top 605 or bottom 607, or the front 612 or back 614 of the data storage cartridge 600, or at a plurality of locations described above.

Figure 7:
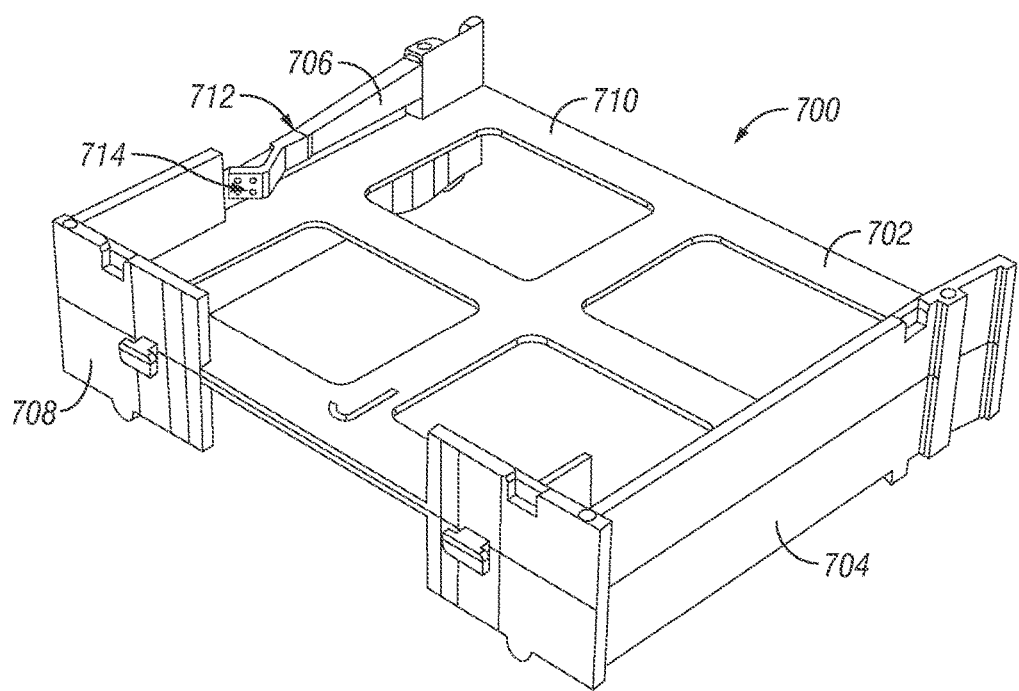
FIG. 7 illustrates a storage cell in accordance with an embodiment of the invention.
Figure 8:
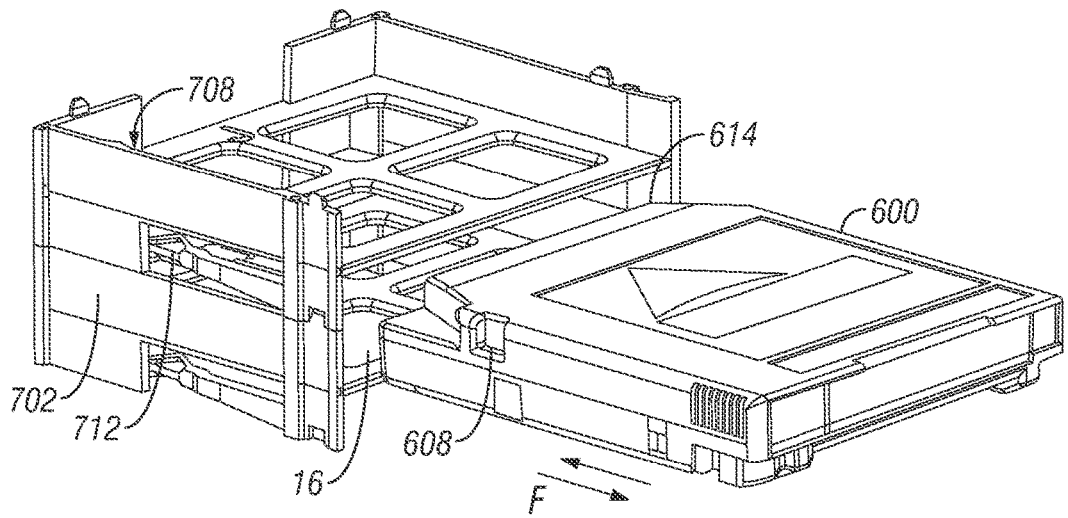
FIG. 8 illustrates the insertion and removal of a data storage cartridge from a storage cell and in accordance with and embodiment of the invention.

FIG. 7 illustrates an embodiment of a storage cell 16 comprising storage cell housing 702. The housing 702 includes a pair of opposing side walls 704, 706, a back wall 708, and a floor 710 which is orthogonal and connected to the two opposing side walls 704, 706 and the back wall 710. The side walls 704, 706, back wall 708, and floor 710 define an opening for inserting and removing data storage cartridge 600. As shown in FIG. 8, the housing 702 is modular in nature and can be stacked over another housing to form a larger array of a plurality of storage cells 16. For example, FIG. 2 illustrates a plurality of storage cells 16 on front wall 17 and rear wall 19 of an automated data storage library 10. Returning to FIG. 7, the housing 702 conforms substantially to the shape and size of a data storage cartridge 600 with tolerances that allow the easy and convenient insertion of the cartridge through the storage cell 16 opening.

The housing 702 includes a retention tab 712 for engaging the notch 608 of data storage cartridge 600 when the data storage cartridge is inserted into the storage cell 16. The retention tab 712 protrudes from a side wall 706 of the housing 702 and depresses out of the path of the data storage cartridge when the data storage cartridge is inserted within the housing 712 and engages with the notch 608 of the data storage cartridge 600. The retention tab 712, when engaged with the notch 608 of data storage cartridge, retains the data storage cartridge 600 within the storage cell 16 and prevents the data storage cartridge 600 from falling out from the storage cell 16 due to outside influences such as machine vibration or opening or closing of a door to the automated storage library.

In one embodiment, the retention tab 712 includes at least one textured surface 714 that contacts the notch 608 on data storage cartridge 600 when the data storage cartridge is inserted into the storage cell 16. The textured area 714 of the retention tab 712 may include a texture of bumps, lines or grooves or any combination including at least one of bumps, lines, or grooves. The texture on textured surface 714 of retention tab 712 reduces the contact surface between the retention tab 712 and the notch 608 of the data storage cartridge 600. Accordingly the reduced contact surface between the retention tab 712 and the notch 608 of the data storage cartridge 600 reduces the amount of friction between the retention tab 712 and the notch 608 of the data storage cartridge 600 such that the data storage cartridge 600 can be removed from the storage cell 16 with less force than compared to a retention tab 712 with a non-textured surface. For example, tests have shown that providing a textured area 714 on retention tab 712 reduces the force required to pull data storage cartridge 600 from the storage cell 16 by thirty to fifty percent. Further, the textured surface 714 of the retention tab 712 allows for a more consistent force to be applied in order remove each of the data storage cartridges from their respective storage cells 16.

While FIG. 7 shows that the retention tab 712 is on a side wall 706 of the housing 702, it should be understood that the retention tab 712 could be on either side wall 704, 706 or floor 710 that corresponds with the notch 608 of the data storage cartridge 600 when inserted into the storage cell 16. Still further, while FIG. 7 shows that only area 714 of retention tab 712 includes texture, one of ordinary skill in the art would understand that the entire retention tab 712 may be textured, or that other surfaces that contact the notch 608 of data storage cartridge 600 may be textured. Finally, it should be understood that while the texture in the present embodiment is described to only include bumps, lines and grooves, one of ordinary skill in the art should understand that the texture on texture surface 714 of retention tab may be any texture that reduces the contact surface between the retention tab 712 and the notch 608 of the data storage cartridge 600.

Returning to FIG. 6, in one embodiment, the notch 608 of data storage cartridge 600 includes at least one textured surface 616. Still further, in one embodiment, the notch 608 of data storage cartridge 600 includes at least one textured surface that contacts the retention tab 712 when the data storage cartridge 600 is inserted into storage cell 16. The textured area 616 of the notch may include a texture of bumps, lines, or grooves or any combination including at least one of bumps, lines, or grooves. The texture on textured surface 616 of the notch 608 reduces the contact surface between the retention tab 712 and the notch 608 of the data storage cartridge 600. Accordingly the reduced contact surface between the retention tab 712 and the notch 608 of the data storage cartridge 600 reduces the amount of friction between the retention tab 712 and the notch 608 of the data storage cartridge 600 such that the data storage cartridge 600 can be removed from the storage cell 16 with less force than compared to a notch with a non-textured surface. For example, test have shown that providing a textured area 616 on notch 608 of the data storage cartridge 600 reduces the force required to pull data storage cartridge 600 from the storage cell 16 by thirty to fifty percent. Further, the textured surface 616 of the notch 608 of the data storage cartridge 600 allows for a more consistent force to be applied in order remove each of the data storage cartridges from their respective storage cells 16.

While FIG. 6 shows that only area 616 of notch 608 includes texture, one of ordinary skill in the art would understand that the entire notch 608 may be textured, or that other surfaces that contact the retention tab 712 of the storage cell 16 may be textured. Finally, it should be understood that while the texture in the present embodiment is described to only include bumps, lines and grooves the texture on texture surface 616 of notch 608 may be any texture that reduces the contact surface between the retention tab 712 and the notch 608 of the data storage cartridge 600.

The textured surface 616 of the notch 608 and the textured surface 714 of the retention tab 712 can be provided by any means. In one embodiment the textured surface may be molded, over-molded, roughened, or scraped, however, the invention should not be limited to these methods. Further, while the above description includes in which the either the retention tab 712 may have a textured surface 714 or the notch 608 of the data storage cartridge 600 may have a textured surface 616, one of ordinary skill in the art would understand, that in one embodiment, both the retention tab 712 and the notch 608 may have textured surfaces.

FIG. 8 illustrates an embodiment of data storage cartridge 600 is inserted and removed from the storage cell 16 of an automated data storage library 10. In one embodiment, the data storage cartridge 600 is inserted and removed from the storage cell 16 by accessor 18 with a gripper assembly 20. The accessor 18 inserts data storage cartridge 600 with the back 614 of the data cartridge housing 602 facing the back wall 708 of the storage cell housing 702. As shown in FIG. 8, the notch 608 of the data storage cartridge 600 aligns with the retention tab 712. As the accessor 18 inserts the data storage cartridge 600 in the storage cell the retention tab 712 depresses out of the path of the data storage cartridge 600 and engages with the notch 608 of the data storage cartridge 600.

Figure 9:
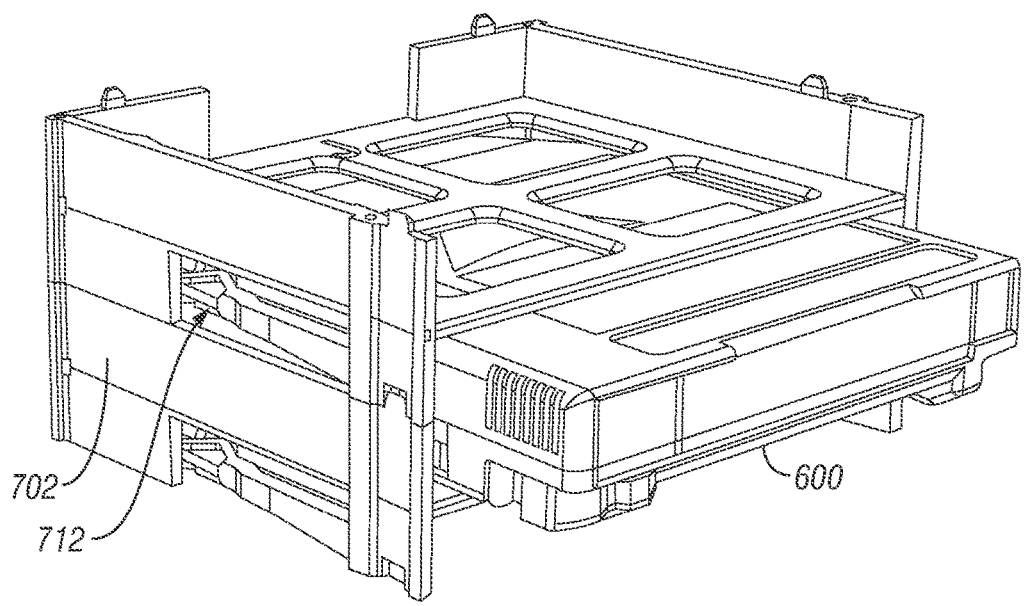
FIG. 9 illustrates a data storage cartridge inserted in a storage cell in accordance with and embodiment of the invention Features, elements, and aspects of the invention that are referenced by the same numerals in different figures represent the same, equivalent, or similar features, elements, or aspects, in accordance with one or more embodiments.

FIG. 9 illustrates data storage cartridge 600 inserted within the storage cell 16. The retention tab 712 is engaged with the notch 608 of the data storage cartridge 600. The retention tab 712 contacts the notch 608 along a textured interface. For example, area 714 of retention tab 712 may contact area 616 of notch 608 when the data cartridge is fully inserted within the storage cell 16. In one embodiment, area 714 of retention tab is textured. In another embodiment area 616 of notch 608 as textured. In yet another embodiment, both areas 714 of the retention tab and area 616 of notch 608 are textured. By providing textured areas 714 and/or 616 the contact surface between the retention tab 712 and the notch 608 of the data storage cartridge 600 is reduced. The texture of textured areas 616 and 714 may include a texture of bumps, lines or grooves or any combination including at least one of bumps, lines, or grooves. Still further, the texture may include any texture that increases the surface area of the textured areas 714 and 616 the retention tab 712 and notch 608, respectively.

Returning to FIG. 8, the accessor 18 removes the data storage cartridge 600 from the storage cell 16 by applying a force, F, in the direction indicated by FIG. 8. The reduced contact surface between the retention tab 712 and the notch 608 of the data storage cartridge 600 reduces the amount of friction between the retention tab 712 and the notch 608 of the data storage cartridge 600 such that the data storage cartridge 600 can be removed from the storage cell 16 with less force than compared to two non-textured surfaces in contact. Further, the textured surface on one of at least the notch 608 of the data storage cartridge 600 and the retention tab 712 of the storage cell allows for a more consistent force, F, to be applied to remove each of the data storage cartridges from their respective storage cells. Therefore, an accessor may be able to provide a low and consistent force to remove a plurality of data storage cartridges from their respective storage cells.

As described, embodiments of the present invention allow for a textured interface between a notch of a data storage cartridge and a retention tab of a storage cell to provide a consistent and low friction force that retains the data storage cartridge within the cell but allows the accessor to easily remove the data storage cartridge when needed. The textured surface reduces the contact surface between the retention tab and the notch of the data storage cartridge. Accordingly, the reduced contact surface between the retention tab and notch reduces the amount of friction between the retention tab and the notch. The data storage cartridge can thus be removed from the storage cell with less force than that required by the prior art having a generally smooth interface between the notch of the data storage cartridge and the retention tab of the storage cell. Further, the textured surface allows for a more consistent amount of friction between the notch and retention tab for each data storage cartridge and its respective storage cell such that a consistent amount of force can be applied by the accessor to remove each data storage cartridge from their respective storage cells.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A method, comprising:
   inserting a data storage cartridge into an opening in a housing, the housing having a retention tab in the housing for engaging with a notch of the data storage cartridge for retaining the data storage cartridge in the housing,
   wherein the retention tab has a texture, wherein the texture of the retention tab is configured to reduce a force necessary for removing the data storage cartridge from the housing.

2. The method of claim 1, wherein the housing includes a pair of opposing side walls, a back wall, and a floor orthogonal and connected to the side walls and the back wall, and wherein the side walls, back wall, and floor, define the opening for inserting and removing the data storage cartridge, wherein the retention tab protrudes from at least one side wall of the housing.

3. The method of claim 1, wherein the retention tab depresses out of a path of the data storage cartridge when the data storage cartridge is inserted in the housing and engages with the notch of the data storage cartridge when the data storage cartridge is fully inserted in the housing.

4. The method of claim 1, wherein the retention tab has at least one textured surface that contacts the notch on a side wall of the data storage cartridge when the data storage cartridge is inserted into the housing.

5. The method of claim 1, wherein the texture of the retention tab comprises bumps.

6. The method of claim 1, wherein the texture of the retention tab comprises lines.

7. The method of claim 1, wherein the texture of the retention tab comprises grooves.

8. The method of claim 1, wherein the data storage cartridge is inserted into the opening by an accessor.

9. The method of claim 1, wherein the housing is part of a storage cell in an automated data storage library having an array of storage cells.

10. The method of claim 9, wherein the data storage cartridge is inserted into the opening by an accessor.

11. The method of claim 1, comprising removing the data storage cartridge from the housing.

12. A method, comprising:
    removing a data storage cartridge through an opening in a housing, the data storage cartridge being in the housing prior to the removing;
    wherein the housing has a retention tab in the housing that is engaged with a notch of the data storage cartridge for retaining the data storage cartridge in the housing when the data storage cartridge is in the housing, and
    wherein the retention tab has a texture, wherein the texture of the retention tab reduces a force necessary for removing the data storage cartridge from the housing.

13. The method of claim 12, wherein the housing includes a pair of opposing side walls, a back wall, and a floor orthogonal and connected to the side walls and the back wall, and wherein the side walls, back wall, and floor, define the opening for inserting and removing the data storage cartridge, wherein the retention tab protrudes from at least one side wall of the housing.

14. The method of claim 12, wherein the retention tab depresses out of a path of the data storage cartridge when the data storage cartridge is inserted in the housing and engages with the notch of the data storage cartridge when the data storage cartridge is fully inserted in the housing.

15. The method of claim 12, wherein the retention tab has at least one textured surface that contacts the notch on a side wall of the data storage cartridge when the data storage cartridge is inserted into the housing.

16. The method of claim 12, wherein the texture of the retention tab comprises bumps.

17. The method of claim 12, wherein the texture of the retention tab comprises lines.

18. The method of claim 12, wherein the texture of the retention tab comprises grooves.

19. The method of claim 12, wherein the data storage cartridge is inserted into the opening by an accessor.

20. The method of claim 12, wherein the housing is part of a storage cell in an automated data storage library having an array of storage cells.

* * * * *